United States Patent [19]
Lee

[11] Patent Number: 5,825,568
[45] Date of Patent: Oct. 20, 1998

[54] SERVO ADDRESS MARK DETECTION COMPENSATING CIRCUIT

[75] Inventor: Kwang-Heui Lee, Suwon, Rep. of Korea

[73] Assignee: SamSung Electronics Co. Ltd., Suwon, Rep. of Korea

[21] Appl. No.: 424,862

[22] Filed: Apr. 18, 1995

[30] Foreign Application Priority Data

May 11, 1994 [KR] Rep. of Korea .................. 1994/10323

[51] Int. Cl.⁶ .............................. G11B 5/09; G11B 5/596
[52] U.S. Cl. .......................... 360/51; 49/77.08; 49/78.14
[58] Field of Search ................................ 360/46, 48, 51, 360/77.08, 78.14, 49; 375/354, 355, 360

[56] References Cited

U.S. PATENT DOCUMENTS

| | | | |
|---|---|---|---|
| 4,297,737 | 10/1981 | Andresen et al. | 360/135 |
| 4,598,327 | 7/1986 | Jen et al. | 360/77 |
| 4,737,869 | 4/1988 | Sugaya et al. | 360/77 |
| 4,797,757 | 1/1989 | Haitani | 360/77.08 |
| 4,910,617 | 3/1990 | Brunnett et al. | 360/78.14 |
| 5,023,732 | 6/1991 | Murakami et al. | 360/77.08 |
| 5,047,877 | 9/1991 | Herting | 360/51 |
| 5,276,564 | 1/1994 | Hessing et al. | 360/51 |
| 5,285,327 | 2/1994 | Hetzler | 360/48 |
| 5,307,216 | 4/1994 | Cook et al. | 360/72.1 |
| 5,315,456 | 5/1994 | Hessing et al. | 360/77.08 |
| 5,317,461 | 5/1994 | Okamoto et al. | 360/77.08 |
| 5,353,175 | 10/1994 | Chiba | 360/51 |
| 5,384,671 | 1/1995 | Fisher | 360/51 |
| 5,420,730 | 5/1995 | Moon et al. | 360/51 |

*Primary Examiner*—Thang V. Tran
*Assistant Examiner*—Regina Y. Neal
*Attorney, Agent, or Firm*—Robert E. Bushnell, Esq.

[57] ABSTRACT

A servo address mark (SAM) detection compensating circuit in a disk recording apparatus includes a servo address mark (SAM) detector that receives an end of sector (ENDS) signal indicating that the end of a prescribed recording region has been reached, generates a synchronizing signal (SYNC) when the servo address mark (SAM) is detected during a window enable interval, and generates an error detection signal when the servo address mark (SAM) is not detected during the window enable interval. A first storage device generates a first count value representative of a first time interval extending from when detection of the servo address mark (SAM) is expected to when a desired recording region is to be sampled, and a second storage device generates a second count value in response to the error detection signal. The second count value represents a second time interval extending from when detection of the servo address mark (SAM) is expected to when the window enable interval ends. A counter performs a counting operation from a starting point determined in dependence upon whether or not the servo address mark (SAM) is detected during the window enable interval, and maintains a current count value. A comparator compares the first count value stored in the first storage device with the current count value of the counter, and generates a sampling enable signal to accurately detect a desired recording region when the current count value and the first count value are equal.

20 Claims, 3 Drawing Sheets

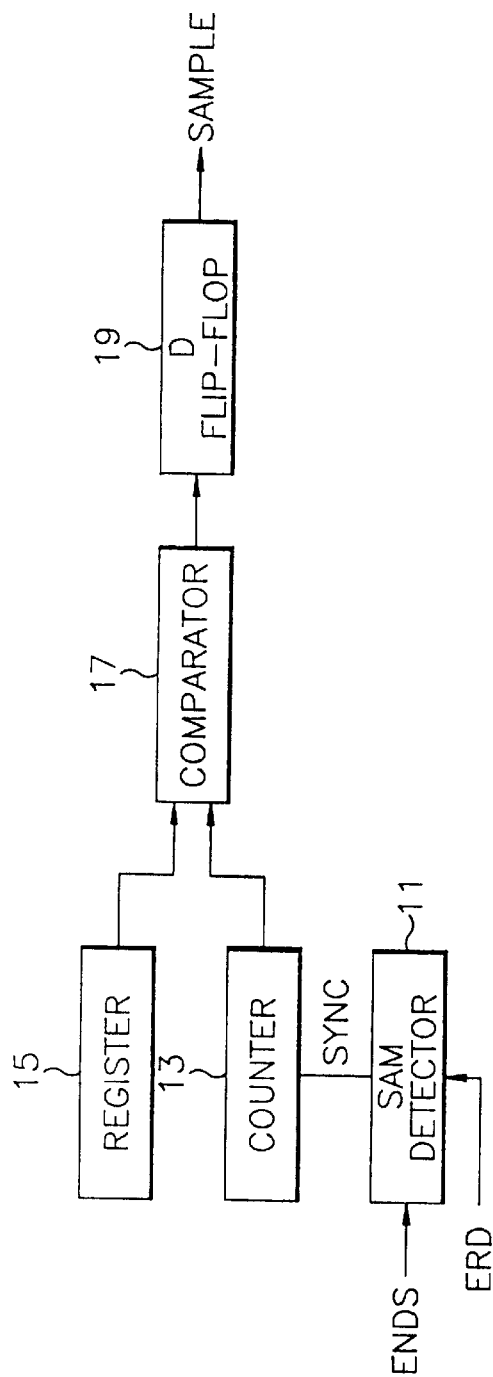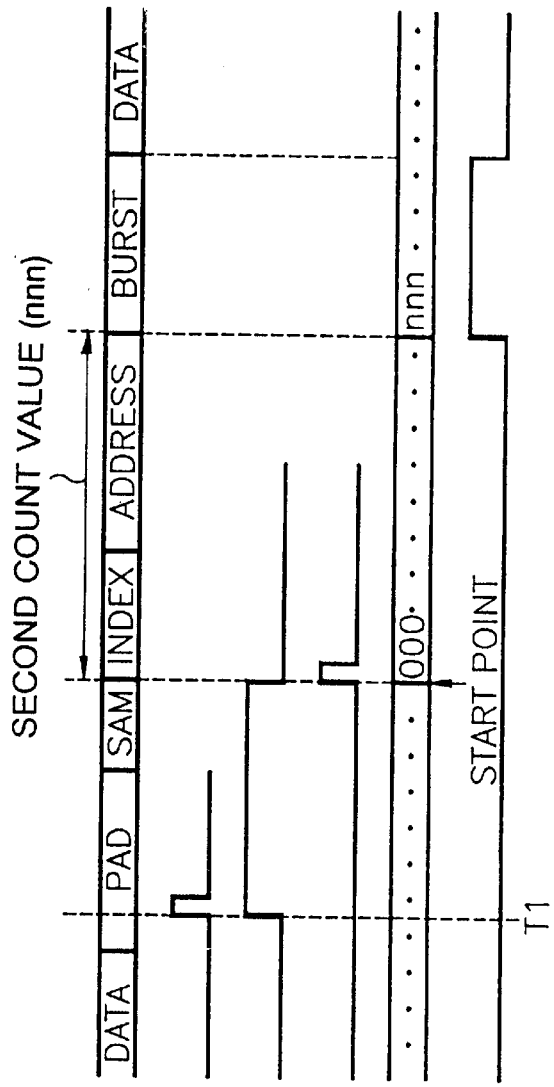

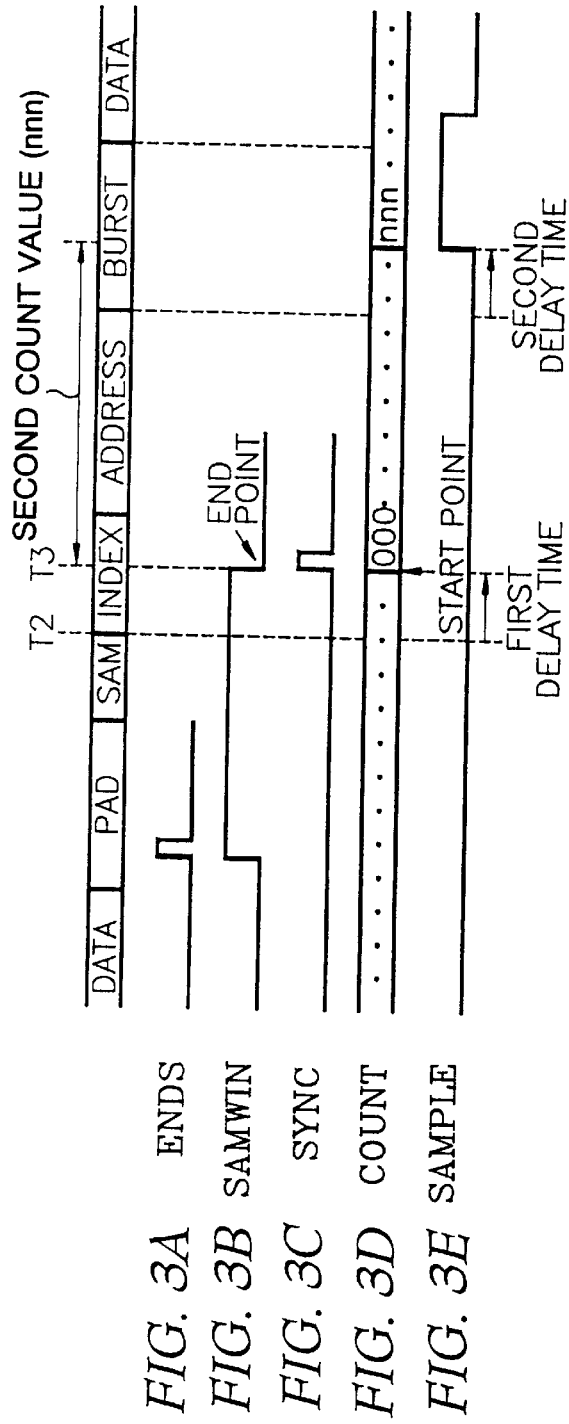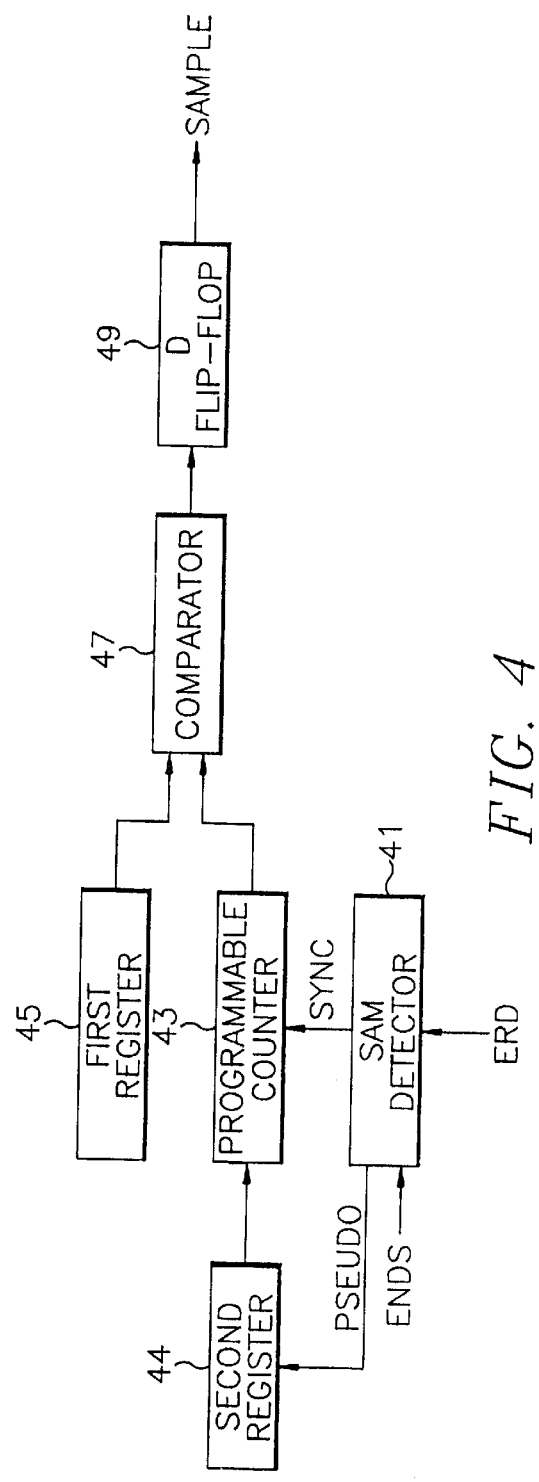

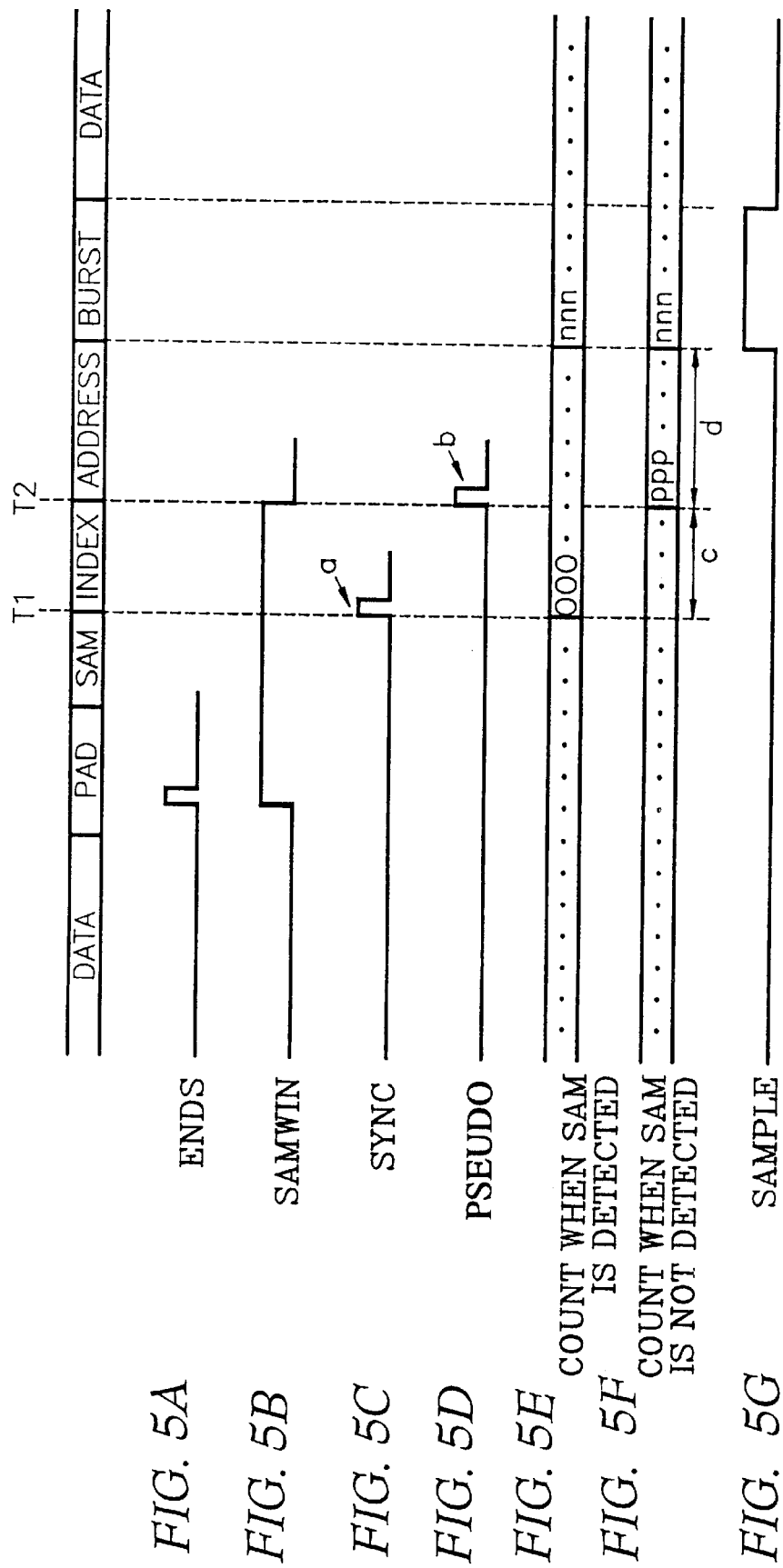

SERVO ADDRESS MARK DETECTION COMPENSATING CIRCUIT

CROSS-REFERENCE TO RELATED APPLICATIONS

This application makes reference to, incorporates the same herein, and claims all benefits accruing under 35 U.S.C. §119 from an application for *Servo Address Mark Detection Compensating Circuit* filed in the Korean Industrial Property Office on 11 May 1994 and there assigned Ser. No. 10323/1994.

BACKGROUND OF THE INVENTION

The present invention relates to a disk recording apparatus for reading and writing data from and onto a disk recording medium divided into a servo region and a data recording region, and more particularly to a circuit for compensating for errors in detecting a servo address mark (SAM) indicating a starting point of the servo region.

Floppy disk drives and hard disk drives are examples of apparatuses for reading data from and writing data onto a disk recording medium. In the servo region of these disk recording mediums, servo information is recorded to enable the reading or writing of data at a desired position. A servo address mark (SAM) is recorded at the starting point of the servo region to enable synchronized detection of the servo information. The servo address mark (SAM) is represented as a direct current (DC) gap or interval on the disk recording medium, and is also referred to as a servo start mark or a servo gap. The apparatus generates window signals in synchronization with a detected starting point of the servo address mark (SAM) to enable accurate detection and sampling of information intervals or regions on the disk recording medium, such as a servo address region, a burst region and a data region. Without accurate detection of the various regions on the disk recording medium, errors during reading and writing cycles of the apparatus can occur.

One prior art apparatus directed towards ensuring that various regions of the disk recording medium are detected with precision is disclosed in U.S. Pat. No. 5,317,461 entitled *Magnetic Disk Apparatus Having A Circuit For Detecting A Position Of Servo Information Recorded On A Target Track* issued to Okamoto et al. on 31 May 1994. In Okamoto et al. '461, a servo identification detecting circuit generates a first detection signal when a servo area is detected on a magnetic disk, and a data reproduction circuit generates a second detection signal when read data pulses are detected on a signal reproduced from the magnetic disk. Sampling pulses are generated when the second detection signal indicates that the generation of read data pulses has terminated, and the position of the magnetic head is determined in synchronism with the sampling pulses. While conventional apparatuses such as Okamoto et al. '461 have merit in their own right, I believe that further improvements can be made to the art.

SUMMARY OF THE INVENTION

Accordingly, it is an object of the present invention to provide an improved device and method for locating data regions on a disk recording medium in a disk recording apparatus.

It is another object to provide a servo address mark (SAM) detection compensating circuit that compensates for the delay of a sampling enable signal.

It is yet another object to provide a circuit that compensates for the delay of a sampling enable signal by estimating a servo address mark (SAM) detecting time when a servo address mark (SAM) detection error occurs.

It is still yet another object to provide a circuit that compensates for the delay of a sampling enable signal by utilizing a programmable counting means.

These and other objects can be provided by the present invention with a servo address mark (SAM) detection compensating circuit in a disk recording apparatus. The circuit includes a servo address mark (SAM) detector that receives an end of sector (ENDS) signal indicating that the end of a prescribed recording region has been reached, generates a synchronizing signal (SYNC) when the servo address mark (SAM) is detected during a window enable interval, and generates an error detection signal when the servo address mark (SAM) is not detected during the window enable interval. A first storage device generates a first count value representative of a first time interval extending from when detection of the servo address mark (SAM) is expected to when a desired recording region is to be sampled, and a second storage device generates a second count value in response to the error detection signal. The second count value represents a second time interval extending from when detection of the servo address mark (SAM) is expected to when the window enable interval ends. A counter performs a counting operation from a starting point determined in dependence upon whether or not the servo address mark (SAM) is detected during the window enable interval, and maintains a current count value. A comparator compares the first count value stored in the first storage device with the current count value of the counter, and generates a sampling enable signal to accurately detect a desired recording region when the current count value and the first count value are equal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 1 is a block diagram of a conventional servo address mark (SAM) detection circuit;

FIGS. 2A–2E is a timing chart of the servo address mark (SAM) detection circuit of FIG. 1 when no errors occur in detecting the servo address mark (SAM);

FIGS. 3A–3E is a timing chart of the servo address mark (SAM) detection circuit of FIG. 1 when an error occurs in detecting the servo address mark (SAM);

FIG. 4 is a block diagram of a servo address mark (SAM) detection compensating circuit constructed according to the principles of the present invention; and FIGS. 5A–5G is a timing chart of the servo address mark (SAM) detection compensating circuit of FIG. 4.

DETAILED DESCRIPTION OF THE PREFERRED EMBODIMENT

FIG. 1 illustrates a conventional servo address mark (SAM) detection circuit. A servo address mark (SAM) detector 11 receives an end of sector (ENDS) signal from an end of sector (ENDS) detector (not shown) indicating that the end of a prescribed recording region has been reached, and that detection of the servo address mark (SAM) is expected from encoded read data (ERD) received during a servo address mark window (SAMWIN) enable interval. Servo address mark (SAM) detector 11 generates a synchronizing signal (SYNC) in response to detection of the servo address mark (SAM). A counter 13 is reset in response to the synchronizing signal (SYNC) and begins a counting operation to maintain a first count value. A register 15 stores a second count value. A comparator 17 receives the first count value from counter 13 and the second count value from register 15, and generates a sampling enable signal (SAMPLE) when the first and second values are equal to enable data sampling of a desired recording interval at an appropriate time. A delay (D) flip-flop 19, which functions as a latch, receives the output signal of comparator 17. The encoded read data (ERD) is generated from a read/write channel (not shown) in response to flux variation signals from the rotating disk recording medium.

FIGS. 2A–2E is a timing chart of the servo address mark (SAM) detection circuit of FIG. 1 when no errors occur in detecting the servo address mark (SAM), while FIGS. 3A–3E is a timing chart of the servo address mark (SAM) detection circuit of FIG. 1 when an error occurs in detecting the servo address mark (SAM).

Operation of the servo address mark (SAM) detection circuit of FIG. 1 will now be described with reference to the timing charts of FIGS. 2A–2E and 3A–3E. For purposes of the following description, the recording interval desired for detection is the "burst" region.

When the end of a prescribed data sector on the disk recording medium has been reached, the end of sector (ENDS) signal is applied to servo address mark (SAM) detector 11 at a time T1 indicated in FIGS. 2A–2E. In response, servo address mark (SAM) detector 11 expects the servo address mark (SAM) to be detected during a prescribed interval starting at time T1, that is, during the servo address mark window (SAMWIN) enable interval. If the servo address mark (SAM) is detected within the servo address mark window (SAMWIN) enable interval, servo address mark (SAM) detector 11 generates the synchronizing signal (SYNC). Counter 13, which receives the synchronizing signal (SYNC), is reset and begins counting and maintaining the first count value that is supplied to comparator 17. The synchronizing signal (SYNC) is also fedback to reset a servo address mark window (SAMWIN) signal generator (not shown). Comparator 17 compares the first count value from counter 13 with the second count value stored in register 15. When the first count value equals the second count value, comparator 17 generates the sampling enable signal (SAMPLE) to enable accurate sampling of address, burst and data regions positioned at constant distances from the servo address mark (SAM).

The servo address mark (SAM) detection circuit of FIG. 1, however, is not able to accurately detect the servo address mark (SAM) when a reading or writing error has occurred within the servo region. Therefore, if the servo address mark (SAM) is not detected during the time interval extending from the rising edge of the end of sector (ENDS) signal to the falling edge of the servo address mark window (SAMWIN) enable interval (ie. time T3 shown in FIGS. 3A–3E), servo address mark SAM detector 11 generates the synchronizing signal (SYNC) in a delayed manner. Then, since generation of the synchronizing signal (SYNC) is delayed from the proper synchronizing time T2 by a first delay time, the counting operation of counter 13 is delayed. Consequently, the sampling enable signal (SAMPLE) for sampling the burst region positioned at a constant interval from the actual servo address mark (SAM) is delayed by a second delay time, as shown in FIG. 3E, and an error in detection of the burst region occurs. Therefore, if an error in detecting the servo address mark (SAM) occurs in the servo address mark (SAM) detection circuit of FIG. 1, delays occur in the sampling of the address, burst and data regions.

Referring now to FIG. 4, a servo address mark (SAM) detection compensating circuit constructed according to the principles of the present invention will be described. In FIG. 4, a servo address mark (SAM) detector 41 receives an end of sector (ENDS) signal from an end of sector (ENDS) detector (not shown) when the end of a prescribed data sector on a disk recording medium has been reached. As a result, servo address mark (SAM) detector 41 expects the servo address mark (SAM) to be detected from encoded read data (ERD) received during a servo address mark window (SAMWIN) enable interval. If the servo address mark (SAM) is detected, servo address mark (SAM) detector 41 generates a synchronizing signal (SYNC), and if the servo address mark (SAM) is not detected, servo address mark (SAM) detector 41 generates a pseudo (PSEUDO) signal indicating that an error has occurred in detecting the servo address mark (SAM). A first register 45 stores a first count value indicative of a time interval extending from a time when detection of the servo address mark (SAM) is expected to a time when a burst recording region begins. A second register 44 stores a second count value indicative of a time interval extending from the time when detection of the servo address mark (SAM) is expected to a time when the servo address mark window (SAMWIN) enable interval ends. Second register 44 generates the second count value in response to the pseudo (PSEUDO) signal from servo address mark (SAM) detector 41.

A programmable counter 43, which receives either a signal representative of the second count value from second register 44 or the synchronizing signal (SYNC) from servo address mark (SAM) detector 41, begins a counting operation in dependence upon which signal is received. A comparator 47 compares the first count value stored in first register 45 with the counted value indicated by programmable counter 43, and generates a sampling enable signal (SAMPLE) to enable sampling of the burst recording region when the first and second count values are equal. A delay (D) flip-flop 49, which functions as a latch, receives the sampling enable signal (SAMPLE) from comparator 47.

Referring now to FIGS. 5A–5G, a timing chart of the servo address mark (SAM) detection compensating circuit of FIG. 4 is shown.

In the case that the servo address mark (SAM) is detected, operation of the servo address mark (SAM) detection compensating circuit of FIG. 4 will now be described with reference to FIGS. 5A–5G.

When servo address mark (SAM) detector 41 receives the end of sector (ENDS) signal indicating that the end of a prescribed data sector on the disk recording medium has been reached, servo address mark (SAM) detector 41 responds by anticipating detection of the servo address mark (SAM) during the servo address mark window (SAMWIN) enable interval. When the servo address mark (SAM) is detected, servo address mark (SAM) detector 41 generates the synchronizing signal (SYNC) at a time T1 as indicated by "a" in FIG. 5C. The servo address mark window (SAMWIN) signal is cleared by the synchronizing signal (SYNC). Programmable counter 43 receives the synchronizing signal (SYNC) and is reset to start a counting operation from an initial value (e.g. 000). During the counting operation, programmable counter 43 supplies a current count value to comparator 47. Comparator 47 compares the first count value (e.g. nnn) stored in first register 45 with the current count value from programmable counter 43. When the current value and the first count value become equal, comparator 47 generates the sampling enable signal (SAMPLE) to enable accurate sampling of the burst recording region positioned a constant distance from the servo address mark (SAM).

In the case that a servo address mark (SAM) detection error occurs, operation of the servo address mark (SAM) detection compensating circuit of FIG. 4 will now be described.

When servo address mark (SAM) detector 41 receives the end of sector (ENDS) signal indicating that the end of a prescribed data sector of the disk recording medium has been reached, servo address mark (SAM) detector 41 responds by anticipating detection of the servo address mark (SAM) during the servo address mark window (SAMWIN) enable interval. If the servo address mark (SAM) is not detected during the servo address mark window (SAMWIN) enable interval, servo address mark (SAM) detector 41 generates the pseudo (PSEUDO) signal at a time T2 as indicated by "b" in FIG. 5D. Second register 44, which receives the pseudo (PSEUDO) signal, generates the second count value (e.g. ppp, where ppp is less than nnn). The second count value ppp is an estimated counting value representative of the duration "c" shown in FIG. 5F. Duration "c" represents the time interval from when the servo address mark (SAM) is normally detected (i.e. time T1 in FIGS. 5A–5G) to the ending point of the servo address mark window (SAMWIN) enable interval (i.e. time T2 in FIGS. 5A–5G), and may be designated by the manufacturer.

Programmable counter 43 receives the second count value representative of the time duration "c", begins a counting operation and provides a current count value to comparator 47. Comparator 47 compares the first count value stored in first register 45 with the current count value provided from programmable counter 43. When the current count value equals the first count value, comparator 47 generates the sampling enable signal (SAMPLE) to enable sampling of the burst recording region at a time duration "d" after generation of the pseudo (PSEUDO) signal at time T2.

As described above, the circuit and process described in the foregoing paragraphs contemplates a programmable counter and estimation of the servo address mark (SAM) detection time to compensate for the delay in the sampling interval that occurs when a servo address mark (SAM) detection error occurs.

What is claimed is:

1. A servo address mark detection compensating circuit for use in a disk recording apparatus for reading and writing data from and onto a disk recording medium, said circuit comprising:

servo address mark detecting means for generating a synchronizing signal when a servo address mark is detected from a disk recording medium during a window enable interval, and alternatively generating an error detection signal when said servo address mark is not detected from the disk recording medium during said window enable interval;

storage means for storing a first count value representative of a first time interval defined from when detection of said servo address mark is expected to when a burst region begins, and for storing a second count value representative of a second time interval defined from when the detection of said servo address mark is expected to when said window enable interval ends;

counting means for performing a counting operation and maintaining a current count value, said counting means beginning said counting operation from one of an initial value in response to said synchronizing signal, and alternatively from said second count value in response to said error detection signal; and means for generating a sampling enable signal to enable detection and sampling of said burst region, when said current count value reaches said first count value.

2. The servo address mark detection compensating circuit as claimed in claim 1, further comprising:

latch means for receiving said sampling enable signal and functioning as a latch.

3. The servo address mark detection compensating circuit as claimed in claim 1, wherein said storage means comprises:

a first register for storing said first count value; and a second register for storing said second count value.

4. The servo address mark detection compensating circuit as claimed in claim 1, wherein said counting means corresponds to a programmable counter, and said second count value is greater than said initial value and corresponds to a count value counted from a time when detection of said servo address mark is expected to a time when said window enable interval ends.

5. A servo address mark detection compensating circuit for use in a hard disk recording apparatus for reading and writing data from and onto a disk recording medium exhibiting a servo region having a burst region and a data region, said circuit comprising:

servo address mark detecting means for generating a synchronizing signal when a servo address mark indicative of a starting point of said servo region is detected from the disk recording medium during a window enable interval, and alternatively for generating an error detection signal when said servo address mark is not detected during said window enable interval;

storage means for storing a first reference value representative of a first time interval defined from a normal detection time of said servo address mark to a starting time of said burst region, and a second reference value representative of a second time interval defined from said normal detection time of said servo address mark to an ending time of said window enable interval;

counting means for maintaining a current count value of a counting operation beginning from one of an initial value in response to said synchronizing signal and said second reference value in response to said error detection signal; and means for generating a sampling enable signal to enable sampling of said burst region, when said current count value reaches said first reference value.

6. The servo address mark detection compensating circuit as claimed in claim 5, further comprising:

latch means for receiving said sampling enable signal and functioning as a latch.

7. The servo address mark detection compensating circuit as claimed in claim 5, wherein said storage means comprises:

a first register for storing said first reference value; and a second register for storing said second reference value.

8. A method for compensating for an error in detecting a servo address mark indicative of a starting point of a servo region having a burst region and a data region on a disk recording medium to enable detection and sampling of said burst region, comprising the steps of:

initiating a window interval to enable detection of said servo address mark in response to an end signal indicating that an end of a first region on said disk recording medium has been reached;

generating a synchronizing signal when said servo address mark is detected during said window interval, and alternatively generating an error detection signal upon expiration of said window interval when said servo address mark is not detected during said window interval;

beginning a first counting operation when said synchronizing signal has been generated, and alternatively beginning a second counting operation when said error detection signal has been generated; and generating a sampling enable signal to enable detection and sampling of said burst region on said disk recording medium, when a current count value from one of said first counting operation and said second counting operation reaches a predetermined count value indicating a beginning of said burst region.

9. The method of claim 8, further comprised of said first counting operation beginning counting from a first reference value until the current count value of said first counting operation reaches said predetermined count value, and said second counting operation beginning counting from a second reference value higher than said first reference value until the current count value of said second counting operation reaches said predetermined count value.

10. The method of claim 8, further comprising a step of latching said sampling enable signal.

11. The method of claim 9, further comprised of said second reference value corresponding to a count value from a time when detection of said servo address mark is expected to a time when said window interval expires.

12. An apparatus for compensating for an error in detecting a servo address mark indicative of a starting point of a servo region having a burst region and a data region on a disk recording medium to enable detection and sampling of said burst region, said apparatus comprising:

servo address mark detection means for generating a synchronizing signal when said servo address mark is detected during a window interval, and alternatively for generating an error detection signal when said servo address mark is not detected during said window interval;

counting means for beginning a first counting operation in response to generation of said synchronizing signal, and alternatively for beginning a second counting operation in response to generation of said error detection signal; and means for generating a sampling enable signal to enable detection and sampling of said burst region on said disk recording medium, when a count value from one of said first counting operation and said second counting operation reaches a predetermined value indicating a beginning of said burst region.

13. The apparatus of claim 12, further comprised of said counting means comprising a programmable counter.

14. The apparatus of claim 12, further comprising latching means for latching said sampling enable signal.

15. A method for detecting and sampling a burst region on a disk recording medium, comprising the steps of:

initiating a window interval to enable detection of a servo address mark on said disk recording medium;

generating a synchronizing signal when said servo address mark is detected during said window interval, and alternatively generating an error detection signal upon expiration of said window interval when said servo address mark is not detected during said window interval;

performing a first counting operation when said synchronizing signal has been generated in response to detection of said servo address mark during said window interval until a count value of said first counting operation starting from a first reference value reaches a predetermined value indicating a beginning of said burst region;

alternatively performing a second counting operation when said error detection signal has been generated in response to non detection of said servo address mark during said window interval until a count value of said first counting operation starting from a second reference value greater than said first reference value reaches said predetermined value; and detecting and sampling said burst region in response to termination of one of said first counting operation and said second counting operation.

16. The method of claim 15, further comprised of said first reference value corresponding to a count value from a time when detection of said servo address mark is expected to a time when said window interval expires.

17. A circuit for use in a disk recording apparatus, said circuit comprising:

a servo address mark detector for detecting a servo address mark from a disk recording medium of said disk recording apparatus, said servo address mark detector generating a synchronizing signal when said servo address mark is detected during a prescribed time interval, and alternatively, generating an error detection signal when said servo address mark is not detected during said prescribed time interval;

a first register for outputting a first count value representative of a first time interval defined from when detection of said servo address mark is expected to when a burst region on said disk recording medium begins;

a second register for outputting a second count value representative of a second time interval defined from when detection of said servo address mark is expected to when said prescribed time interval ends;

a counter for performing a counting operation and outputting a current count value based on said counting operation, said counter beginning said counting operation from an initial count value in response to said synchronizing signal, and alternatively, beginning said counting operation from said second count value in response to said error detection signal; and a comparator for comparing said first count value output from said first register with said current count value output from said counter, and generating a sampling enable signal to enable detection and sampling of said burst region when said first count value and said current count value are equal.

18. The circuit of claim 17, wherein said first time interval has a longer duration than said second time interval.

19. The circuit of claim 17, further comprising a flip-flop for latching said sampling enable signal provided from said comparator.

20. The circuit of claim 17, wherein said counter comprises a programmable counter.

* * * * *